US006921226B2

(12) United States Patent
Rundle et al.

(10) Patent No.: US 6,921,226 B2
(45) Date of Patent: Jul. 26, 2005

(54) ADJUSTABLE SUPPORT APPARATUS

(75) Inventors: Kenneth P. Rundle, Independence, OH (US); Daniel N. Kelsch, Fairview Park, OH (US)

(73) Assignee: Biomec, Inc., Cleveland, OH (US)

( * ) Notice: Subject to any disclaimer, the term of this patent is extended or adjusted under 35 U.S.C. 154(b) by 55 days.

(21) Appl. No.: 10/390,835

(22) Filed: Mar. 18, 2003

(65) Prior Publication Data

US 2003/0185621 A1 Oct. 2, 2003

Related U.S. Application Data

(60) Provisional application No. 60/368,174, filed on Mar. 27, 2002.

(51) Int. Cl.[7] .......................... A61B 17/02; F16C 11/00; F16D 1/12; F16D 3/00
(52) U.S. Cl. .......................... 403/77; 403/135; 403/143; 403/165; 403/374.3
(58) Field of Search .............................. 403/52, 56, 61, 403/66, 76–78, 82–85, 87, 88–102, 115, 119, 122–128, 131, 133–135, 142, 143, 164, 165, 256–264, 299, 315, 374.3, 408.1; 600/226–244, 197, 154, 136–143, 114, 125

(56) References Cited

U.S. PATENT DOCUMENTS

| 3,278,207 | A | | 10/1966 | Barish et al. |
|---|---|---|---|---|
| 3,441,300 | A | * | 4/1969 | Chow .......................... 403/125 |
| 5,215,167 | A | * | 6/1993 | Davidson ................. 188/24.19 |
| 5,405,347 | A | | 4/1995 | Lee et al. ...................... 606/54 |
| 5,609,565 | A | | 3/1997 | Nakamura .................. 600/229 |
| 6,007,486 | A | | 12/1999 | Hunt et al. .................. 600/205 |
| 6,013,027 | A | | 1/2000 | Khan et al. .................. 600/201 |
| 6,193,652 | B1 | | 2/2001 | Berky et al. ................. 600/205 |
| 6,254,532 | B1 | | 7/2001 | Paolitto et al. ............. 600/201 |
| 6,315,718 | B1 | | 11/2001 | Sharratt ...................... 600/228 |
| 6,338,738 | B1 | | 1/2002 | Bellotti et al. .............. 606/232 |
| 6,632,170 | B1 | | 10/2003 | Bohanan et al. ............ 600/102 |

* cited by examiner

Primary Examiner—Christopher J. Novosad
(74) Attorney, Agent, or Firm—Pearne & Gordon LLP

(57) ABSTRACT

An adjustable support apparatus for, e.g., supporting an instrument. The adjustable support apparatus may include a supporting member, an adjustable member engaging with the supporting member, a fastening member engaged with the adjustable member and an elongated member engaged with the adjustable member and adapted to interact with an instrument.

16 Claims, 3 Drawing Sheets

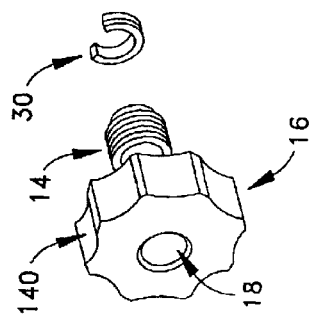
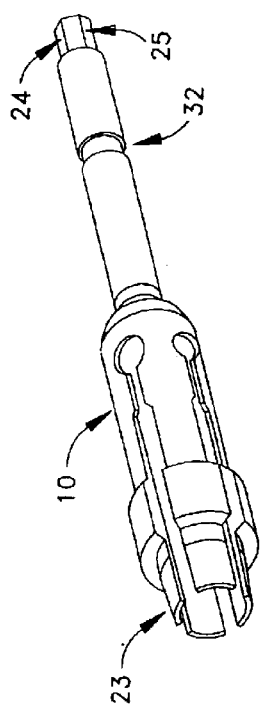
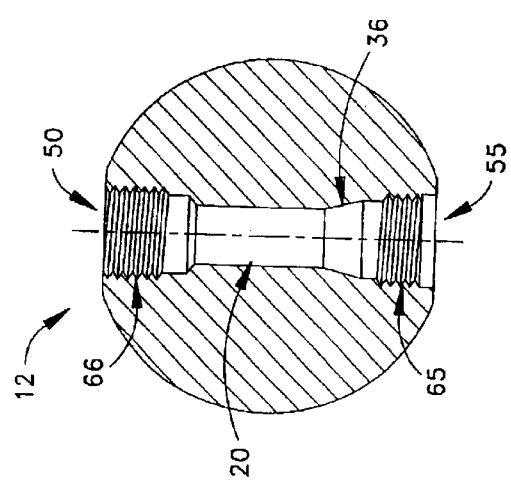

ADJUSTABLE SUPPORT APPARATUS

FIELD OF THE INVENTION

The present invention relates to an adjustable support apparatus, and more particularly the present invention relates to an adjustable support apparatus for, e.g., connecting a shaft to a ball joint.

DESCRIPTION OF THE RELATED ART

In devices having ball joints, such as articulated arms for holding surgical instruments, a shaft is conventionally connected to the ball by a thread. The shaft carries a coupling for connecting to the surgical instrument.

This conventional design has a drawback in that, especially when subjected to torque, the threaded connection may loosen. Therefore, in applications where torque may be present, a coupling which is not subject to loosening by torsion forces is needed.

Further, threaded connections may require the mechanical assistance of tools, such as wrenches, to be adequately tightened and subsequently loosened for removal. Thus, it is desirable for a coupling to be easily engaged and released by hand, without the assistance of tools.

BRIEF SUMMARY OF THE INVENTION

In accordance with one aspect, the present invention provides an adjustable support apparatus that includes a supporting member, a pivotally adjustable member engaged with the supporting member, an elongated member supported on the adjustable member and adapted to interact with an instrument, and a fastening member engaged with the adjustable member. The fastening member is arranged around and rotationally decoupled from the elongated member. The adjustable support apparatus may additionally include a means for locking the elongated member and a means for retaining the elongated member relative to the adjustable member.

BRIEF DESCRIPTION OF THE DRAWINGS

FIG. 3 is a sectional view of the adjustable member of FIGS. 1 and 2; and

FIG. 4 is an exploded view of a portion of FIGS. 1 and 2, showing an elongated member, a fastening member and means for retaining the elongated member.

DESCRIPTION OF EXAMPLE EMBODIMENTS OF THE INVENTION

According to an example embodiment, disclosed is an adjustable support apparatus 100 for, e.g., a holding device. The adjustable support 100 is usable in, inter alia, devices having ball joints, such as articulated arms for holding surgical instruments.

Figure 2:
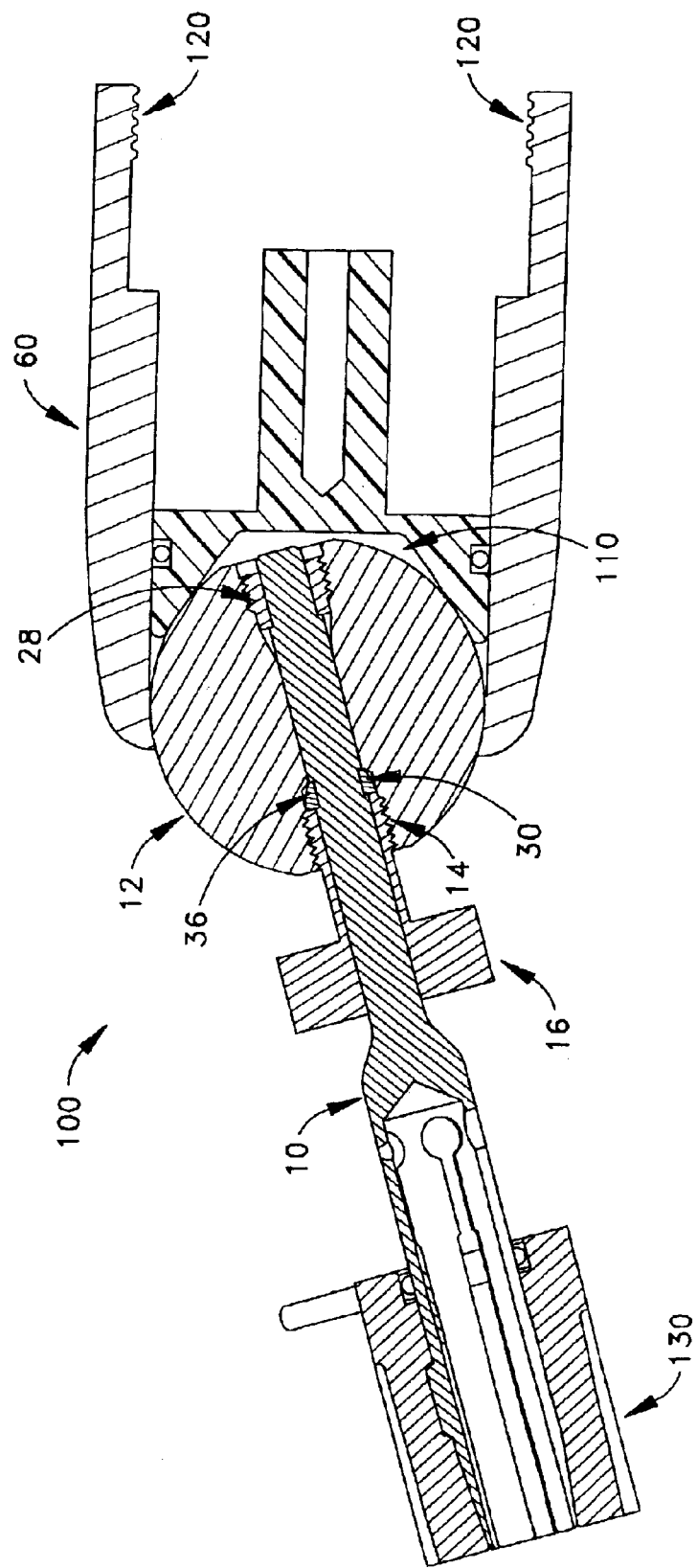
FIG. 2 is a sectional view showing the adjustable support apparatus taken along section line 2—2 of FIG. 1.

According to an example embodiment, the adjustable support 100 includes a supporting member 60, an adjustable member 12, an elongated member 10, and a fastening member 16, etc. In one example, the adjustable member 12 may be a spherical member, the elongated member 10 may be a shaft-like member and the fastening member 16 may be a nut-like member. The supporting member 60 includes means for engaging the adjustable member 12 at one end of the supporting member 60. With reference to FIG. 2, an example means for engaging the adjustable member 12 is depicted as a socket-like member 110 capable of receiving and securing the adjustable member 12 while permitting rotational and swivel-like movement of the adjustable member 12. It is to be understood that other arrangements for the socket 110 are contemplated by the present invention.

At an end distal to the socket 110, the supporting member 60 includes means for engaging the supporting member 60 with a fixed support (not shown). With reference to FIG. 2, an example-means for engaging the supporting member 60 with the fixed support is depicted as a threaded portion 120. A threaded portion complementary to the supporting member's 60 threaded portion 120 may be provided on the fixed support for securably engaging the supporting member 60 to the fixed support. The fixed support may be any structure sufficient to hold the supporting member 60 in a desired arrangement. It is to be understood that other arrangements for the means for engaging the supporting member 60 with the fixed support are contemplated by the present invention.

The adjustable member 12 is, e.g., a generally round member adapted to be secured by the socket 110 of the supporting member 60 and to secure the elongated member 10. With reference to FIG. 3, an example embodiment of the adjustable member 12 includes a through-bore section 20 adapted to receive the elongated member 10. The through-bore section 20 includes a first engaging section 50, a second engaging section 55, and a third engaging section 36. The first engaging section 50 and the second engaging section 55 may include threaded sections 66 and 65, respectively. The threaded section 65 of the adjustable member 12 is adapted to engage a threaded section 14 of a fastening member 16 (FIG. 4). The threaded section 66 is adapted to engage a means for locking the elongated member 28 (FIG. 2). The third engaging section 36 is a portion of the through-bore 20 located medial to the first engaging section 50 and the second engaging section 55. The third engaging section 36 may be a tapered portion and be characterized by a diameter that gradually decreases along its longitudinal axis from its end closest to the first engaging section 50 toward its end closest to the second engaging section 55 and is adapted to engage a means for retaining the elongated member 30 (to be discussed later).

Figure 1:
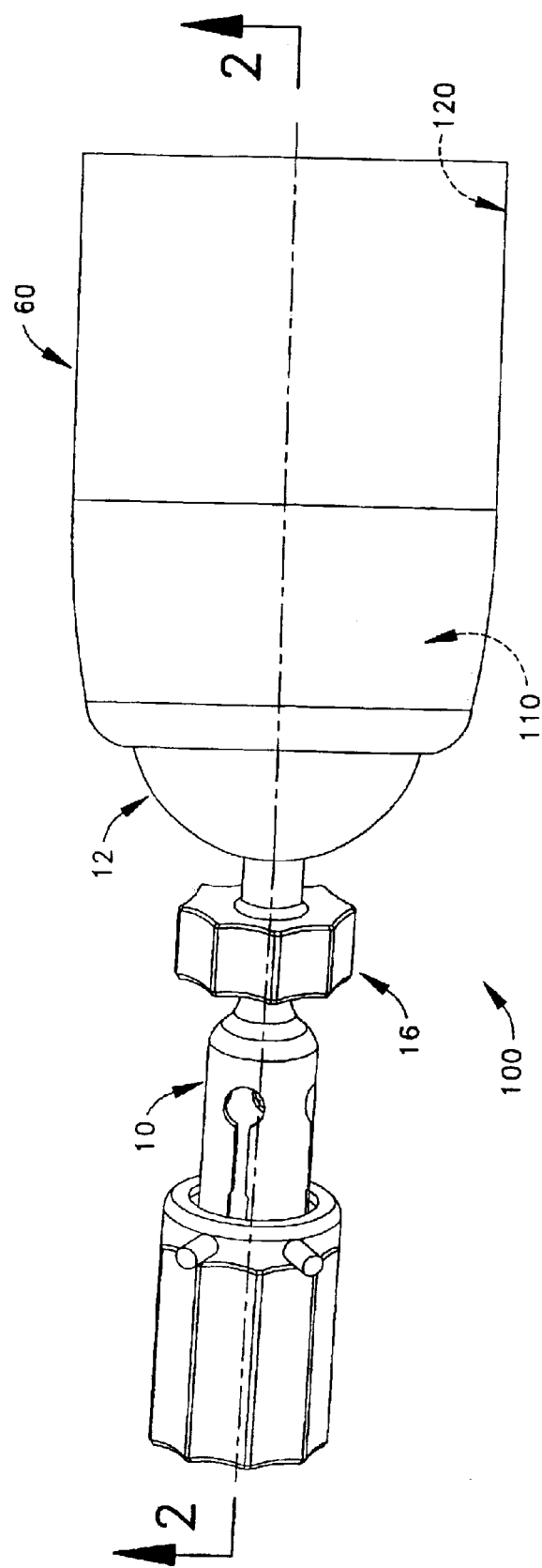
FIG. 1 is a plan view showing an adjustable support apparatus according to the present invention.

The elongated member 10 is adapted to be secured by the adjustable member 12 and to secure, e.g., an instrument 130 (FIG. 1). In one example, the instrument 130 is a surgical instrument. The second end 23 may have any configuration sufficient to securably engage the elongated member 10 with the instrument 130. With reference to FIG. 4, an example elongated member 10 includes a first end 25, a second end 23 and a grooved portion 32. The first end 25 of the elongated member 10 is adapted to be inserted into the through-bore 20 of the adjustable member 12 and be secured in the same. The first end 25 may include a locking member 24 adapted to engage the means for locking the elongated member 28 (to be discussed later). In one example, the locking member 24 is a keying. In a further example, the keying is a hex keying, i.e., a keying having six facets.

With reference to FIG. 4, the grooved portion 32 is an annular section of the elongated member 12 having a reduced diameter. The grooved portion 32 is adapted to be engaged with the means for retaining the elongated member 30 (to be described later).

With reference to FIGS. 2 and 4, the fastening member 16 is adapted to slidably engage the elongated member 10 and affect the securing of the elongated member 10 to the adjustable member 12. The elongated member 10 is decoupled from the fastening member 16; i.e., the elongated member 10 can rotate within the fastening member 16 without causing rotational movement of the fastening member 16. The fastening member 16 has a through-bore section 18, a threaded portion 14 and a user-interface section 140. The through-bore section 18 of the fastening member 16 is a hollow cylindrical section of generally uniform diameter that proceeds longitudinally along the length of the fastening member 16. The bore 18 provides a passage through which the elongated member 10 is engaged. In one example, the threaded portion 14 of the fastening member 16 is an externally threaded portion that interacts with the threaded section 65 of the second engaging section 55 of the adjustable member's 12 bore 20.

The adjustable member 12 may further includes the means for locking the elongated member 28. According to one example, the means for locking the elongated member 28 is a set screw and has an externally threaded section and an internal hollow section of a shape complementary to the shape of the locking member 24 of the elongated member 10. The externally threaded portion of the means for locking the elongated member 28 is adapted to interact with the threading 66 of the first engaging section 50 of the adjustable member's 12 bore 20. The internal hollow section of the means for locking the elongated member 28 is adapted to receive the locking member 24 of the elongated member 10 and restrict the rotation movement thereof.

With reference to FIGS. 2 and 4, the adjustable support 100 further includes the means for retaining the elongated member 30 adapted to simultaneously engage the grooved portion 32 of the elongated member 10 and the third engaging section 36 (FIG. 3) of the bore 20 of the adjustable member 12. In one example, means for retaining the elongated member 30 is an open taper ring characterized by a shape complementary to the shape of the third engaging section/tapered portion 36. In particular, the open taper ring 30 is an annular member having an inner diameter generally constant along its length and an outer diameter that gradually decreases along the longitudinal axis of the open taper ring 30. In a further example, the open taper ring 30 is penannular, i.e., it has a section removed to facilitate its attachment to the grooved portion 32 of the elongated member 10.

An example principle of operation of the adjustable support apparatus 100 will now be discussed. It is to be understood that when a previously discussed element is described in this section, that element generally has the same attributes as discussed supra. With reference to FIG. 2, the socket 110 of the supporting member 60 is provided with the adjustable member 12. The first engaging section 50 of the adjustable member's 12 bore 20 is provided with the means for locking the elongated member 28. The means for locking the elongated member 28 may be screwed into the threaded section 66 of the bore 20.

The elongated member 10 is inserted through the bore 18 of the fastening member 16 and the elongated member 10 is provided with the means for retaining the elongated member 30. The means for retaining the elongated member 30 can be mounted on the elongated member 10 around the grooved portion 32. The fastening member 16 with the elongated member 10 inserted therethrough, and with the means for retaining the elongated member 30 affixed to the grooved portion 32, is inserted into the bore 20 of the adjustable member 12. As the elongated member 10 is inserted into the bore 20 of the adjustable member 12, the locking member 24 of the elongated member 10 penetrates the internal hollow section of the means for locking the elongated member 28.

Concurrently with inserting the elongated member 10 into the bore 20 of the adjustable member 12, a user will grasp the user interface 140 of the fastening member 16 and begin screwing the threaded portion 14 of the fastening member 16 into the threaded section 65 of the second engaging section 55 of the adjustable member 12. As the fastening member 16 is screwed into the adjustable member 12, two events occur. First, the locking member 24 of the elongated member 10 fully penetrates the means for locking the elongated member 28. Second, as the fastening member 16 is screwed into the adjustable member 12, the means for retaining the elongated member 30 is made to more tightly grasp the elongated member 10 around the grooved portion 32.

As previously stated, the outer diameter of the means for retaining the elongated member 30 gradually decreases along its length. According to one example, the means for retaining the elongated member is an open taper ring 30 attached to the grooved portion 32 of the elongated member 10 in a certain orientation; the open taper ring 30 is oriented around the grooved portion 32 with the most reduced portion of the outer diameter being closest to the locking member 24 and the largest portion of the outer diameter being further away from the locking member 24. Similarly, the third engaging section 36, or tapered portion, of the adjustable member's 12 bore 20 tapers with its section closest to the second engaging section 55 having the largest diameter and the diameter gradually increasing long its length toward the first engaging section 50. Thus, the open taper ring 30, as arranged on the elongated member 10 is complementary to the tapered portion 36 of the bore 20. As the fastening member 16 is screwed into the adjustable member 12, the taper portion of the adjustable member 12 acts on the open taper ring 30 and gradually forces the open taper ring 30 tight around the grooved portion 32 of the elongated member 10.

When the fastening member 16 is fully screwed into the adjustable member 12, and the adjustable support 100 is assembled, the following characteristics are displayed by the adjustable support 100. First, the adjustable member 12 is able to freely swivel and rotate in the socket 110 of the supporting member 60. Second, the rotational movement of the elongated member 10 relative to the adjustable member is restrained by the interaction of the locking member 24 of the elongated member 10 and the means for locking the elongated member 28. Third, the elongated member 10 is held in a retained relationship to the adjustable member 12 by the interaction of the open taper ring 30 around the grooved portion 32 of the elongated member 10 and the tapered portion 36 of the adjustable member 12.

These characteristics confer a number of advantages. One such advantage concerns the reliability of the adjustable support 100. As previously mentioned, the instrument 130 can be attached to the elongated member 10. Because the elongated member 10 is decoupled from the fastening member 16 and coupled to the adjustable member 12, frequent and repeated movement of the instrument 130 (and thereby elongated member 10) do not cause a subsequent loosening of the fastening member 16 from the adjustable member 12. This advantage enables a user to use the adjustable support 100 under any conditions, even under duress, without needing to retighten the fastening member 16.

It is to be understood that various other advantages, aspects and embodiments of the present invention are possible and are contemplated by the present invention. The disclosure herein is by way of example only and is not intended to limit the scope of the disclosure.

What is claimed is:

1. An adjustable support apparatus comprising:
   a support member;
   a pivotally adjustable member engaged with the support member;
   an elongated member supported on the adjustable member and adapted to interact with an instrument, the elongated member comprising a locking portion;
   a fastening member engaged with the adjustable member for securing the elongated member relative to the adjustable member;
   a means for locking the elongated member; and
   an engaging section that interacts with the means for locking the elongated member;
   wherein the fastening member is arranged around and rotationally decoupled from the elongated member;
   wherein the means for locking the elongated member constrains the rotational movement of the elongated member relative to the rotational movement of the adjustable member;
   wherein the locking portion of the elongated member interacts with the means for locking the elongated member; and
   wherein the means for locking the elongated member is a set screw having a central portion complementary in shape to the shape of the locking portion of the elongated member.

2. An adjustable support apparatus comprising:
   a support member;
   a pivotally adjustable member engaged with the support member;
   an elongated member supported on the adjustable member and adapted to interact with an instrument;
   a fastening member engaged with the adjustable member for securing the elongated member relative to the adjustable member; and
   a means for retaining the elongated member relative to the adjustable member;
   wherein the fastening member is arranged around and rotationally decoupled from the elongated member; and
   wherein the means for retaining the elongated member interacts with an annular grooved portion on the elongated member.

3. The apparatus of claim 2, further comprising an engaging section that interacts with the means for retaining the elongated member.

4. The apparatus of claim 3, wherein the means for retaining the elongated member is an annular member arranged on the annular grooved portion of the elongated member.

5. The apparatus of claim 4, wherein the annular member comprises an outer diameter, and wherein the outer diameter is tapered along a longitudinal axis of the annular member.

6. The apparatus of claim 4, wherein the engaging section that interacts with the means for retaining the elongated member has a portion tapered along its longitudinal axis, and wherein the tapered portion interacts with the means for retaining the elongated member.

7. The apparatus of claim 2, further comprising an engaging section that interacts with the fastening member.

8. An adjustable support apparatus comprising:
   a support member;
   a pivotally adjustable member engaged with the support member;
   an elongated member supported on the adjustable member and adapted to interact with an instrument;
   a fastening member engaged with the adjustable member for securing the elongated member relative to the adjustable member; and
   an engaging section that interacts with the fastening member;
   wherein the fastening member is arranged around and rotationally decoupled from the elongated member; and
   wherein the fastening member comprises a longitudinal hollow portion and an external threaded section.

9. The apparatus of claim 8 further comprising a means for locking the elongated member, wherein the means for locking the elongated member constrains the rotational movement of the elongated member relative to the rotational movement of the adjustable member.

10. The apparatus of claim 9, wherein the elongated member comprises a locking portion.

11. The apparatus of claim 10, wherein the locking portion is a hex keying.

12. The apparatus of claim 10, wherein the locking portion of the elongated member interacts with the means for locking the elongated member.

13. The apparatus of claim 12, further comprising an engaging section that interacts with the means for locking the elongated member.

14. The apparatus of claim 8 further comprising a means for retaining the elongated member relative to the adjustable member.

15. The apparatus of claim 8, wherein the elongated member is positioned in the longitudinal hollow portion of the fastening member.

16. The apparatus of claim 8 further comprising a means for locking the elongated member, wherein the means for locking the elongated member constrains the rotational movement of the elongated member relative to the rotational movement of the adjustable member, and a means for retaining the elongated member relative to the adjustable member.

* * * * *